UNITED STATES PATENT OFFICE.

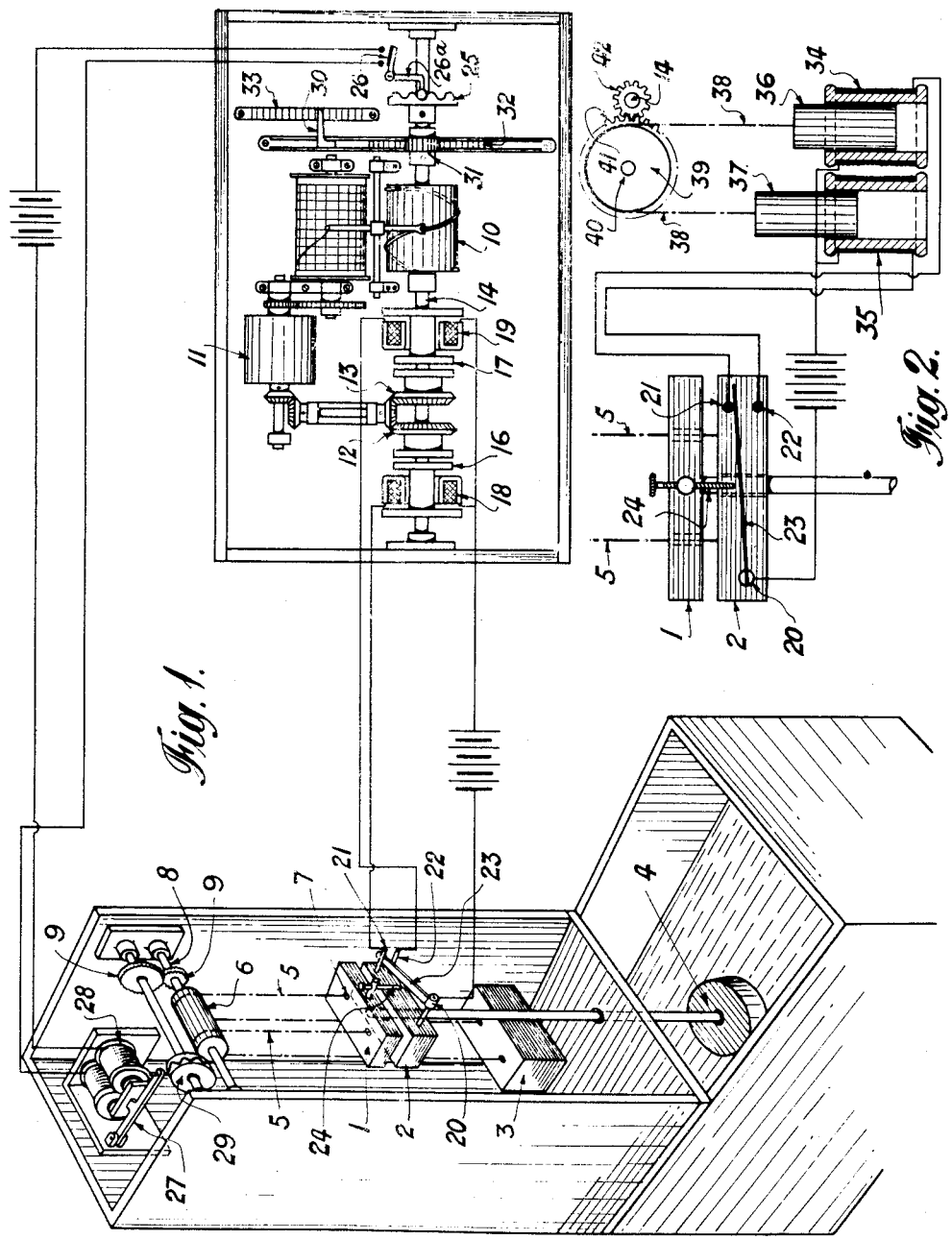

ATHOL WILFRID CLARKE, OF CHORLTON-CUM-HARDY, NEAR MANCHESTER, ENGLAND.

APPARATUS FOR RECORDING OR INDICATING THE MOVEMENTS OF A MASS.

1,350,705.  Specification of Letters Patent.  Patented Aug. 24, 1920.

Application filed June 2, 1919. Serial No. 301,310.

*To all whom it may concern:*

Be it known that I, ATHOL WILFRID CLARKE, a subject of the King of Great Britain and Ireland, and resident of Chorlton-cum-Hardy, near Manchester, England, have invented certain new and useful Improvements in Apparatus for Recording or Indicating the Movements of a Mass, of which the following is a specification.

This invention relates to apparatus for registering or recording and (or) indicating the movements of a body or mass and has for its object to provide electrically controlled means whereby such movements may be recorded or indicated at a position or positions remote from the moving element.

The invention is primarily intended for recording remotely the movements of a measuring member in a liquid, gas or electric meter either in direct proportion or wherein the indications are integrated with respect to time and according to some desired law, and consists essentially of an integrating drum or other movable element provided with any convenient form of indicator or recording mechanism, adapted to be driven in both directions through suitable gearing by clock-work or other motive power. Interconnected with and acting in synchronism with the drum or the like is a device to synchronize the movements of mechanism, primarily controlled by the measuring member, in unison with the recording mechanism, said device preferably comprising a make-and-break contact controlling the circuit of an electro-magnet which, in turn, acts through an escapement or the like. This mechanism actuates the switches of two electrical circuits which transmit operative power to controlling or actuating mechanism, the actuations of which determine the period and direction of rotation of the integrating drum or the like.

The invention will be more particularly described by the aid of the accompanying drawings, wherein—

Figure 1 is a diagrammatic view showing the invention applied to a liquid meter.

Fig. 2 is a detail view illustrating more particularly the selecting switch for the clutch circuits and a method of actuating the recording mechanism electrically.

In carrying the invention into effect according to one convenient manner the apparatus actuated by the measuring member consists of three weights 1, 2 and 3, the relative mass of which is say 4, 6 and 8 and of which weight 1 is controlled by the moving member. The weight 2 is connected to weight 3 so that they have equal movements, but in the opposite directions and so that one cannot move without the other. In certain positions the mass of the weights 1 and 2 is opposed to the weight 3.

The arrangement is such that should the weight 2 act alone in counter to weight 3 then there will be a preponderance in favor of the latter of 2, while in the event of weight 3 acting in counter to the combined weights 2 and 1 there will be a preponderance of 2 in favor of the latter. Therefore, when not in a state of equilibrium there is a force acting in favor of either one side or the other of 2, a state of equilibrium existing when the measuring member resists the resultant acting force in favor of the weights 2 and 1.

As shown on the drawing the weight 1 is mounted on the stem of the measuring float 4 of a liquid meter, said stem passing through a hole in the weight 2 and the weights 2 and 3 are connected respectively to the opposite ends of flexible cords 5, 5 which pass around a pulley or drum 6, said cords moving freely through holes 7 in the weight 1 so that the latter can come to rest upon the weight 2, the pulley 6 being mounted upon a spindle 8 which is rotated, or rocked, in either direction by the movements of the weights.

The movements of the spindle 8 will preferably be magnified by a train of gear wheels 9, 9 as shown controlled by an escapement, which allows movement in either direction in unison with the recording mechanism as hereinafter explained.

The recording mechanism illustrated comprises an integrating drum 10 or the like, which is driven by clock-work 11 or other motive power through bevel gearing, two oppositely rotating bevel wheels 12, 13 being loosely mounted on the drum spindle 14 and adapted to mesh with a wheel constantly driven from the motor 11. Either of the drum spindle gears 12 or 13 are operatively connected to said spindle by clutches 16 or 17 which are actuated by the electromagnets 18 or 19.

A separate electric circuit is provided for each clutch magnet and is of any length according to the distance between the measuring instrument and the recording mechanism. Both circuits have a common terminal 20 and a separate terminal 21 or 22 respectively, located on the weight 2, upon which is also located a pivoted or spring lever 23 adapted to bridge one or other set of terminals 20, 21 or 20, 22, and complete one of the electrical circuits, as controlled by the projection 24 on the weight 1.

Attached to, or in geared relationship with the integrating drum 10 is a disk 25 or the like having a series of notches or studs which operate a make and break contact 26 (through the crank arm 26ª) in the circuit of an electro-magnet 28 which controls the before-mentioned pulley escapement 27, 29 so that with any movement of the integrating drum, the escapement is actuated to allow the weights 2 and 3 to move in a definite ratio.

As before stated the recording mechanism may be any distance away from or in any position relative to, the element whose movement it is desired to record and the operation of the apparatus is as follows:—Assuming an inrush of fluid which causes the float 4 to rise and lift the weight 1 clear of the weight 2, then the removal of the projection 24 allows the spring lever 23 to rise and bridge the terminals 20, 21 thereby completing the circuit to the magnet 18 which throws in the drum clutch 16 thereby causing the bevel wheel 12 to be clutched to the drum spindle and rotary motion in one direction imparted to the latter and simultaneously to the integrating drum 10 and the make and break disk 25 controlling the circuit to the electro-magnet 28. The simultaneous periodic activity of the magnet 28 actuates the escapement 27, 29 to allow the pulley 6 to rotate under the influence of the preponderating weight 3 until the weight 2 rises into contact with the weight 1. The projection 24 on the latter, acting upon the switch lever 23 pushes the same out of engagement with the contact 21 and breaks the circuit to the clutch 16 consequently declutching the respective bevel wheel 12 and allowing the integrating drum 10 to come to rest and remain at rest until further movement of the float takes place.

If the float continues to rise the weight 1 carries the projection 24 out of engagement with the switch lever 23 which rises and again completes the circuit for the same clutch and the cycle of operations is repeated to again rotate the drum in the same direction. If, however, the float falls, the pressure of the weight 1 acting through the projection 24 on the switch lever 23 rocks or depresses the same until the terminals or contacts 20, 22 are bridged thereby completing the circuit for the opposite clutch 17 when the cycle of movement is again repeated but with the integrating drum driven in the reverse direction.

Alternately both clutches may be normally in mesh consequently locking or arresting the motion of the clockwork when the float and consequently the drum are at rest, but when one of the clutches is released, by making or breaking of one of the controlling circuits as before described the clock work is free to drive the drum through the respective gear wheel remaining clutched to the drum spindle, the reversal of the drum will be obvious from the last example.

In some cases the clockwork and clutches may be dispensed with and the drum rotated by other means for instance solenoids, as illustrated in Fig. 2. In this case two solenoids 34, 35, are in circuit with the contacts 21 and 22 respectively and the common terminal 20. The solenoid cores 36, 37 are connected by a flexible cable 38 which passes over a pulley 39 on the counter shaft 40. A gear wheel 41 on the shaft 40 meshes with a smaller wheel 42 on the spindle 14 in order to magnify the movement of the solenoid cores and rotate the integrating drum 10 or move the indicator 30 to the required extent. The operation of the device will be obvious from the drawings.

The integrating drum is shown controlling the pen of a recording chart, but it will be understood that counting or other registering or recording mechanism may be controlled from the spindle 14 or the motion of the latter imparted to an indicator such as 30 shown to the right of the integrating drum in Fig. 1 in which a gear wheel 31 on the spindle 14 meshes with a rack on the sliding bar 32 to which the pointer 30 is attached, said pointer moving over a scale 33. The reading may be directly proportional to the movement of the measuring member or integrated according to some desired law. It is to be understood that the pen of the recording chart and the before mentioned counting or other registering or recording mechanism may be actuated by a direct acting element controlled in a similar manner in place of the aforesaid integrating drum.

By the means described the recording mechanism can be located in any convenient station at any desired distance from the measuring apparatus and if desired two or more records of the same measuring apparatus may be taken at different stations by separate recording means similarly controlled thereby.

What I claim is:—

1. Apparatus for recording remotely the movements of a body or mass comprising means for registering or recording the movements of the body or mass in combination with actuating mechanism adapted to act in both directions, an electro-magnet and a make and break contact acting in synchronism with the registering or recording mechanism to control the circuit of said electro-magnet, an escapement actuated by said electro-magnet, a measuring member, mechanism regulated by the escapement and controlled by the measuring member to actuate the switch of two electrical circuits which transmit operative power to controlling or actuating mechanism, the actuation of which determine the period and direction of movement of the registering or recording element, substantially as described.

2. Apparatus for recording remotely the movements of a body or mass comprising means for indicating the movements of the body or mass in combination with actuating mechanism adapted to act in both directions, an electro-magnet and a make and break contact acting in synchronism with the indicator to control the circuit of said electro-magnet, an escapement actuated by said electro-magnet, a measuring member, mechanism regulated by the escapement and controlled by the measuring member to actuate the switch of two electrical circuits which transmit operative power to controlling or actuating mechanism, the actuation of which determine the period and direction of movement of the indicator element, substantially as described.

3. Apparatus for recording remotely the movements of a body or mass comprising means for registering or recording or indicating the movement of the body or mass and actuating mechanism adapted to act in both directions, a device actuated by the measuring member consisting of three weights of varying mass, two of which are connected so that they have equal and opposite movements while the other is connected to the measuring member, said weights being interconnected and acting to control two electrical circuits which transmit operative power to controlling or actuating mechanism for the recorder, together with an escapement actuated to allow movements of the weights in either direction in unison with the recording mechanism, substantially as described.

4. For use with registering or recording or indicating instruments, means to actuate or control the same when remote from the measuring member comprising two electro-magnets adapted to selectively control two clutches to govern the direction and extent of movement of the recording element, a movable switch to complete either of the two magnet circuits and a system of weights primarily controlled by the measuring member and interconnected so as to control said switch together with an escapement or the like which allows movement in either direction in unison with the recording mechanism, substantially as described.

5. Apparatus for recording remotely the movements of a body or mass comprising means for indicating the movement of the body or mass, comprising a motor adapted to impart motion to an indicator in two directions, clutches to couple the motor to the indicator, magnets adapted to selectively control the clutches, a float, a drum, an escapement for regulating the movement of said drum, an electro-magnet for actuating the escapement, a make and break contact operated by the indicator mechanism to control the circuit to the escapement electro-magnet, unequal sized weights suspended from said drum by flexible members, a switch on one of said weights to selectively complete either of the clutch circuits, and a float controlled weight to control said switch, substantially as described.

In witness whereof I have hereunto set my hand.

ATHOL WILFRID CLARKE.